2,812,374
PRODUCTION OF ACETYLENE BY INCOMPLETE COMBUSTION OF HYDROCARBONS

Erwin Lehrer, Bad Durkheim, and Karl Buschmann, Neustadt/Weinstrasse, Germany, assignors to Badische Anilin- & Soda-Fabrik Aktiengesellschaft, Ludwigshafen (Rhine), Germany No Drawing. Application June 10, 1955, Serial No. 514,754

Claims priority, application Germany June 11, 1954

6 Claims. (Cl. 260—679)

This invention relates to an improved process of manufacturing acetylene by incomplete combustion of hydrocarbons. More specifically the invention is directed to the maintenance of particular reaction conditions in the mixing chamber, where the preheated hydrocarbons and the preheated oxygen are mixed before they are reacted.

Processes are known for the production of acetylene by incomplete combustion of gaseous or vaporous hydrocarbons with oxygen or gas mixtures rich in oxygen according to which the hydrocarbon and the oxygen are separately preheated, then mixed in a mixing apparatus and, after the most complete and thorough mixing possible, subjected to a flame reaction. An elongated, rotation-symmetrical arrangement, such as is described in U. S. patent specification No. 2,664,450, is especially suitable as a mixing apparatus. The hydrocarbon and the oxygen enter at high speed into this mixing room which comprises a mixing tube and a conical mixing chamber as an extension of that tube. The prepared mixture leaves the mixing chamber through a number of parallel channels and flows into the reaction chamber in which the components react with each other with the formation of a flame. The reaction gases are cooled as rapidly as possible, preferably by spraying in water.

Difficulties are encountered in the mixing of the heated gases because the hot gases are in a very reactive state and therefore tend to react with each other with the formation of a flame before entry into the reaction chamber, and the walls of the mixing chamber are damaged by reason of the high temperature of the flame which forms. It is known that metals promote the reaction between oxygen and hydrocarbons by catalytic action, whereas ceramic materials do not accelerate the said reaction. Consequently the mixing of the preheated gases in the production of acetylene from hydrocarbons and oxygen has hitherto been carried out in a mixing chamber having ceramic walls.

It has now been found, however, that the ceramic material of the mixing chamber has disadvantages in prolonged operation. By the repeated heating and cooling and also by reason of the different thermal expansion of the internal parts in contact with the hot gas current and the colder external parts, cracks and fissures occur in the ceramic wall material and lead to leakiness and give rise to uncontrollable currents which unfavorably affect the mixing process. It is then necessary to renew the ceramic material. A further disadvantage of ceramic material resides in the fact that it is difficult to prepare the mixing chamber with the necessary accuracy.

The present invention is based on the knowledge that contrary to previous conceptions it is possible under certain conditions to carry out the mixing of the reaction components in a mixing chamber of metallic material and thus to avoid the disadvantages attendant upon the use of ceramic materials.

It is therefore an object of this invention to provide a process of manufacturing acetylene by incomplete combustion of hydrocarbons while using a mixing chamber which has metallic surfaces. Another object is the maintenance of a certain gradient of the gas speed at the walls of the mixing chamber. Other objects will be apparent from the more detailed description of the invention.

According to this invention the mixing of the gases is carried out in a mixing chamber of which the walls consist of nonscaling metallic material, i. e. a metal or an alloy which is resistant against oxygen at high temperatures, and in which the gradient of the gas speed at the walls lies in the same direction as the mean gas speed of the gas and does not fall below a minimum value of 20, preferably not below 40, centimeters per second per centimeter. When the preheating is sufficiently high, it is true that catalytic reactions take place at individual places of the wall, but these proceed only slowly. If the heat developed thereby is removed sufficiently rapidly by the flowing gas, a stationary condition is set up in which the wall has only a slight excess temperature. The height of this excess temperature depends on the one hand on the catalytic activity of the wall material and on the other hand on the withdrawal of heat for which the gradient of the gas speed at the wall of the mixing chamber is determinative. This gradient should therefore not be below a minimum value which is dependent on the preheating temperature and the wall material.

Alloys of iron with about 5 to 25% of chromium and which may also contain about 0.5 to 2% of aluminum and about 0.4 to 3% of silicon are especially suitable as wall material.

Preferably the metallic wall of the mixing chamber is insulated externally against heat loss by ceramic or other materials of sufficient stability to heat.

Arrangements according to this invention have proved very satisfactory in continuous operation. Whereas arrangements with ceramic walls for the mixing chamber are so badly cracked and fissured after operation for one half to one year that the ceramic material must be renewed, an arrangement with metallic walls of the said kind shows no detectable injury by thermal action after more than one year's operation.

The term "gradient of gas speed" used to describe this invention is synonymous with the term "gradient of gas velocity." As it is well known, the speed of a gas flowing through a tube is not constant throughout the whole cross-section of the tube. Directly on the tube wall the gas speed is zero. The increase of the gas speed with the distance from the tube wall is called gradient of gas speed. The gradient of gas speed may be determined by measuring the gas speed at a defined short distance from the tube wall and dividing the obtained result of the measurement by said distance from the tube wall.

The following example is given as to further illustrate without limiting the invention:

Example

In an apparatus as shown in Figure 1 of U. S. patent specification No. 2,664,450 there are introduced, per hour, 2,000 cubic meters of natural gas and 1,200 cubic meters of oxygen, which are both preheated to a temperature of 650° C. The mixing room consists of a metallic tube and a conical extension having a metallic surface, these metal parts being made from an iron alloy with 6.5% of chromium, 1.5% of silicon, 0.5% of aluminum and 0.15% of carbon. The angle of aperture of the conical extension is so selected that the gas speed gradient of the walls of the mixing chamber is in all the places at least 150 centimeters per second per centimeter. The gas mixture flows from the mixing chamber through the gas distributor in the reaction chamber where the oxygen reacts with the natural gas with the formation of a flame. The gaseous reaction products are cooled by the injection of water. They contain by volume 8.8% of acetylene, 6% of methane, 0.2% of ethylene, 25% of carbon monoxide, 3.4% of carbon dioxide, 56.4% of hydrogen and 0.2% of oxygen. Instead of natural gas other methane containing gas mixtures or pure methane or other gaseous aliphatic hydrocarbons or gas mixtures containing such aliphatic hydrocarbons may be used.

Another suitable alloy for the construction of the inner parts of the mixing chamber contains 23% of chromium, 3% of silicon, 2% of aluminum and 0.15% of carbon, the remainder being substantially all iron.

We claim:

1. In a process for the production of acetylene by incomplete combustion of hydrocarbons with oxygen in which the hydrocarbons and the oxygen are separately preheated and the preheated gases are supplied to a mixing chamber, the mixture then enters a reaction chamber in which a flame reaction takes place and the reaction product is rapidly cooled, the improvement which comprises mixing said preheated gases in a mixing chamber, the surface of the walls of which consists of a metal resistant to oxygen at high temperatures, while maintaining the gradient of the gas speed at the walls throughout said mixing chamber above a minimum value of 20 centimeters per second per centimeter.

2. In a process for the production of acetylene by incomplete combustion of hydrocarbons with oxygen in which the hydrocarbons and the oxygen are separately preheated and the preheated gases are supplied to a mixing chamber, the mixture then enters a reaction chamber in which a flame reaction takes place and the reaction product is rapidly cooled, the improvement which comprises mixing said preheated gases in a mixing chamber, the surface of the walls of which consists of an iron alloy containing from 5 to 25% of chromium, while maintaining the gradient of the gas speed at the walls throughout said mixing chamber above a minimum value of 20 centimeters per second per centimeter.

3. In a process for the production of acetylene by incomplete combustion of hydrocarbons with oxygen in which the hydrocarbons and the oxygen are separately preheated and the preheated gases are supplied to a mixing chamber, the mixture then enters a reaction chamber in which a flame reaction takes place and the reaction product is rapidly cooled, the improvement which comprises mixing said preheated gases in a mixing chamber, the surface of the walls of which consists of an iron alloy containing from 5 to 25% of chromium, from 0.5 to 2% of aluminum and from 0.4 to 3% of silicon, while maintaining the gradient of the gas speed at the walls throughout said mixing chamber above a minimum value of 20 centimeters per second per centimeter.

4. An improved process as defined in claim 1 wherein the gradient of the gas speed at the walls throughout said mixing chamber is maintained above a minimum value of 40 centimeters per second per centimeter.

5. In a process for the production of acetylene by incomplete combustion of hydrocarbons with oxygen in which the hydrocarbons and the oxygen are separately preheated and the preheated gases are supplied to a conically extending mixing chamber, and the mixed gases then enter a reaction chamber in which a flame reaction takes place and the reaction product is rapidly cooled, the improvement which comprises mixing said preheated gases in a mixing chamber, the surface of the walls of which consists of an iron alloy containing about 6.5% of chromium, 1.5% of silicon, 0.5% of aluminum and 0.15% of carbon, while maintaining the gradient of gas speed at the walls throughout said mixing chamber above a minimum value of at least 150 centimeters per second per centimeter.

6. In a process for the production of acetylene by incomplete combustion of hydrocarbons with oxygen in which the hydrocarbons and the oxygen are separately preheated and the preheated gases are supplied to a conically extending mixing chamber, and the mixed gases then enter a reaction chamber in which a flame reaction takes place and the reaction product is rapidly cooled, the improvement which comprises mixing said preheated gases in a mixing chamber, the surface of the walls of which consists of an iron alloy containing about 23% of chromium, 3% of silicon, 2% of aluminum and 0.15% of carbon, while maintaining the gradient of gas speed at the walls throughout said mixing chamber above a minimum value of at least 150 centimeters per second per centimeter.

References Cited in the file of this patent

UNITED STATES PATENTS

| 1,763,421 | De Vries | June 10, 1930 |
| 1,894,116 | Pier | Jan. 10, 1933 |
| 1,995,647 | Pier et al. | Mar. 26, 1935 |
| 2,664,450 | Sachsse et al. | Dec. 29, 1953 |
| 2,672,488 | Jones | Mar. 16, 1954 |
| 2,706,740 | Barusch et al. | Apr. 19, 1955 |